United States Patent [19]

Onagi et al.

[11] Patent Number: 5,382,460
[45] Date of Patent: Jan. 17, 1995

[54] OPTICAL RECORDING DISK AND PRODUCTION PROCESS THEREFOR

[75] Inventors: Nobuaki Onagi; Shinichiro Suzuki; Takamasa Yoshikawa, all of Saitama, Japan

[73] Assignee: Pioneer Electronic Corporation, Tokyo, Japan

[21] Appl. No.: 788,421

[22] Filed: Nov. 6, 1991

[30] Foreign Application Priority Data

May 16, 1991 [JP] Japan .................. 3-111776

[51] Int. Cl.⁶ .................................................. B32B 3/00
[52] U.S. Cl. .................................. 428/64; 428/65; 428/457; 428/913; 346/76 L; 346/135.1; 430/945
[58] Field of Search .................. 428/64, 65, 457, 913; 346/76 L, 135.1; 430/945

[56] References Cited

U.S. PATENT DOCUMENTS

| | | | |
|---|---|---|---|
| 4,981,743 | 1/1991 | Ho | 428/64 |
| 5,098,761 | 3/1992 | Watanabe et al. | 428/64 |
| 5,100,700 | 3/1992 | Ide et al. | 428/64 |
| 5,154,957 | 10/1992 | Yamada et al. | 428/64 |
| 5,171,618 | 12/1992 | Suzuki | 428/64 |

Primary Examiner—Patrick J. Ryan
Assistant Examiner—Elizabeth Evans
Attorney, Agent, or Firm—Kane, Dalsimer, Sullivan, Kurucz, Levy, Eisele and Richard

[57] ABSTRACT

An optical recording disk includes a light transmissive substrate, a recording film disposed on the substrate directly or through an intermediate layer and a protection film disposed on the recording film. The protection film consists of a dielectric material and the entirety of an upper flat surface and a side surface of the recording film is integrally covered with the dielectric material protection film.

5 Claims, 3 Drawing Sheets

DIRECTION OF DEPOSITION

OPTICAL RECORDING DISK AND PRODUCTION PROCESS THEREFOR

BACKGROUND OF THE INVENTION

The present invention relates to an optical recording disk, and more particularly to an optical recording disk comprising a light transmissive substrate, a recording film disposed on the substrate directly or through an intermediate layer, and a protection layer disposed on the recording film, and a process for producing such an optical recording disk.

Hitherto, there has been known, e.g., a photomagnetic disk (or magnetoptical disk) as shown in FIG. 4 as one type of optical recording disk. More specifically in FIG. 4, a dielectric material film 52 is disposed on a substrate 51 in the form of a disk, a recording film 53 comprising a metal is disposed on the dielectric material film 52 and a protection film 54 comprising a dielectric material is disposed on the recording film 53. Further, a protection plate 58 is bonded to the protection film 54, generally through an adhesive layer 55. In addition, an outer peripheral side face of such a photomagnetic disk is filled with a filler material 57 such as resin for the purpose of protecting the recording film 53, particularly the side face thereof.

In the conventional photomagnetic disk as described above, the thin films are particularly produced according to a process as shown in FIGS. 5 and 6. More specifically as shown in FIG. 5, a mask 80 in the form of a ring is first disposed on a peripheral edge of the substrate 51 in the form of a disk which is fixed to a substrate holder 60 disposed in a bell jar (not shown) of a vacuum film formation device. An inner peripheral face 80a of the mask 80 is disposed substantially in parallel with a center line of the mask. After the mask 80 is disposed, the dielectric material film 52, the recording film 53 and the protection film 54 are laminated on the substrate 51 by a vacuum film formation (or vacuum vapor deposition) process such as sputtering, as shown in FIG. 6. Then, the mask 80 is removed and the protection plate 58 is bonded to the resultant product through the adhesive layer 55, and then the outer peripheral face of the resultant optical recording disk is filled with the filler material 57 as shown in FIG. 4.

In the structure of the above conventional optical recording disk, however, the outer peripheral face of the recording film is exposed or is only covered with a filler comprising an organic material, even if the outer peripheral face is covered. As a result, it is not sufficient to prevent the corrosion of the recording film. Accordingly, there is posed a problem such that when the optical recording disk is left standing for a long period of time, the recording film of the optical recording disk begins to be corroded from the outer peripheral portion thereof, whereby the safety or reliability of the resultant product cannot be guaranteed.

SUMMARY OF THE INVENTION

A principal object of the present invention is to solve the above problems and to provide an optical recording disk which is capable of solving the above problems and has a structure being excellent in the corrosion resistance of the recording film, and a process for producing such an optical recording disk.

According to the present invention, there is provided an optical recording disk comprising a light transmissive substrate, a recording film disposed on the substrate directly or through an intermediate layer and a protection film disposed on the recording film, wherein the protection film consists of a dielectric material, and the entirety of an upper flat surface and a side surface of the recording film is integrally covered with the dielectric material protection film.

The present invention also provides a process for producing an optical recording disk, comprising the steps of:

disposing, on a peripheral edge portion of a disk substrate, a mask in the form of a ring which has a projection portion over the entirety of the inner peripheral portion of the ring;

forming a recording film on the substrate by use of a sputtering process; and forming a dielectric material protection film by use of a sputtering process under a working pressure which is higher than that used at the time of the formation of the recording film.

In the recording film of the optical recording disk according to the present invention, the upper flat surface and the entirety of the side surface thereof is integrally covered with the dielectric material protection film, and therefore the corrosion thereof which is particularly liable to occur in the side face (outer peripheral face) thereof can be prevented and the durability of the disk is improved.

In the process for producing an optical recording disk according to the present invention, there is used the mask in the form of a ring which has a projection portion along the entire periphery of the inner peripheral surface, and the dielectric material protection film is formed under a pressure of an inert gas which is higher than that used at the time of the formation of the recording film, whereby the side edge portion of the recording film is covered with the dielectric material protection film.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, there will be described a photomagnetic recording disk as an example of the optical recording disk according to the present invention.

Figure 1:
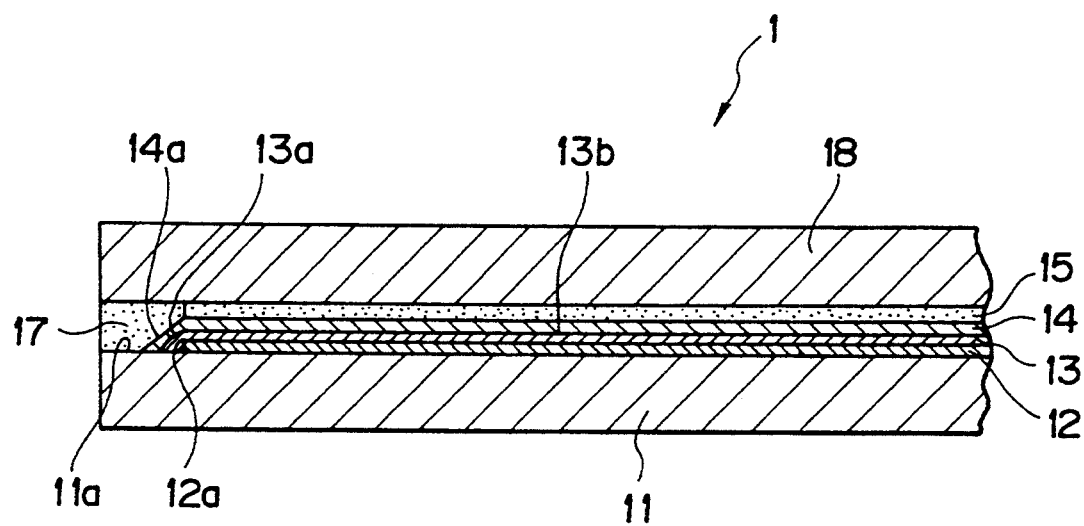
FIG. 1 is a schematic sectional view of a photomagnetic recording disk according to the present invention, wherein a portion thereof is cut away so that the peripheral portion can be observed.

FIG. 1 is a schematic sectional view of a photomagnetic recording disk 1 according to the present invention, wherein a portion thereof is cut away so that the peripheral portion thereof can be observed.

More specifically, the photomagnetic recording disk 1 comprises a substrate 11 in the form of a disk, a dielectric material film 12 as an intermediate layer disposed on the substrate 11, a recording film 13 disposed on the dielectric material film 12, and a protection film 14 consisting of dielectric material disposed on the recording film 13. In general, a protection plate 18 is bonded to the protection film 14 through an adhesive layer 15. In addition, an outer peripheral side face of such a photomagnetic recording disk may preferably be filled with a filler material 17 such as resin for the purpose of protecting the recording film 13, particularly the side face thereof.

The substrate 11 in the form a disk may comprise a light transmissive glass or resin such as polycarbonate (PC) and polymethylmethacrylate (PMMA). Such a substrate 11 may generally have a thickness of about 0.5 to 1.5 mm.

The dielectric material film 12 to be disposed on the substrate 11 may comprise a dielectric material such as ZnS, SiO, SiO$_2$, SiN$_x$ (silicon nitride) AlN, AlON and CaF$_2$. Such a dielectric material film 12 may generally have a thickness of about 50 to 150 nm. The dielectric material film 12 may be laminated on the substrate 11 so that a peripheral edge flat surface 11a of the substrate 11 remains, i.e., the edge flat surface 11a is not covered with the dielectric material film 12.

The recording film 13 to be disposed on such a dielectric material film 12 may comprise a film comprising a metal, particularly a photomagnetic recording material such as TbFeCo, GdTbFe, GaTbCo, GdFeBi, DyFe, GdFe, GdCo, BiSmYbCoGeIG, BiSmErGaIG, GdIG, CoCr, CrO$_2$, PtCo, EuOFe, EuO, MnCuBi, MnAlGe, MnBi and the like. Such a recording film 13 may generally have a thickness of about 15 to 100 nm. The recording film 13 may be laminated on the substrate 11 so that the peripheral edge flat surface 11a of the substrate 11 remains, i.e., the edge flat surface 11a is not covered with the recording film 13 similarly as in the case of the dielectric material film 12 as described above. Another material for the recording film usable in the present invention may comprise any of various known metal materials which are capable of being subjected to optical recording. Specific examples of such a material may include recording materials of a type which is capable of forming a pit, such as Te type, and recording materials of a type which is capable of causing a phase change such as As-Te-Ge type Sn-Te-Se type TeO$_x$ type and Sb$_2$Se$_3$.

The recording film 13 may generally have a thickness of about 15 to 100 nm. It is preferred that an outer peripheral edge portion of such a recording film 13 covers an outer peripheral edge portion 12a of the dielectric material film 12.

The protection film 14 is disposed on the recording film 13. As shown in the drawing, such a protection film 14 is formed so that it integrally covers not only an upper flat surface 13b of the recording film but also the entire surface of a side face 13a thereof. When the protection film 14 is formed in such a manner, the side face of the recording film 13 is prevented from being corroded. Such a protection film 14 may be formed by using a dielectric material such as ZnS, SiO, SiO$_2$, SiN$_x$ (silicon nitride), AlN, AlON and CaF$_2$, and the thickness thereof may generally be about 50 to 100 nm. As described above, the protection plate 18 is bonded to the protection film 14 through the adhesive layer 15, as described hereinabove. The adhesive layer 15 may comprise a material such as ultraviolet ray curing (or hardening) resin, hot melt resin and double side coating tape, and the protection plate 18 may comprise a material such as glass, PC (poly carbonate), and PMMA (polymethylmethacrylate). In a further preferred embodiment, the outer peripheral side face of the optical recording disk is filled with a filler material 17.

Figure 2:
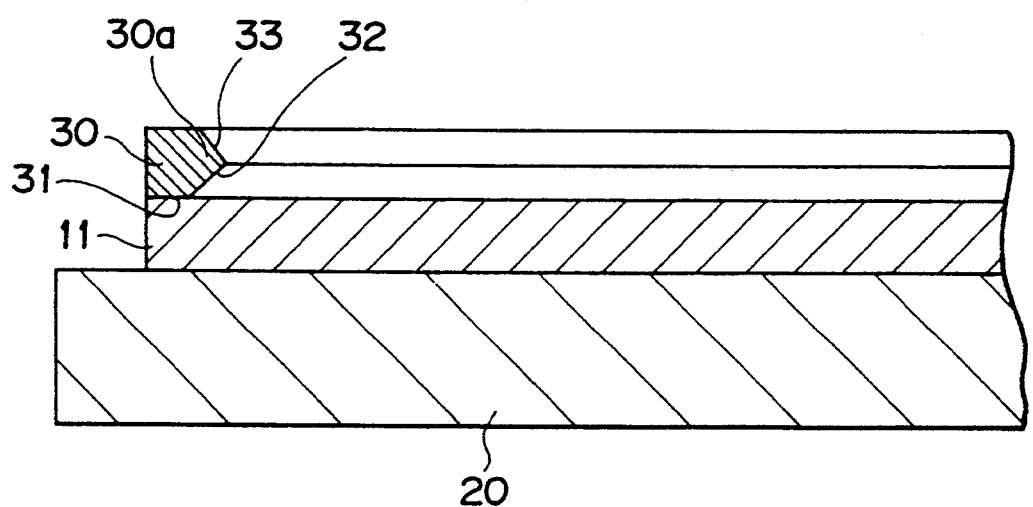
FIG. 2 is a schematic sectional view for illustrating a process for producing the photomagnetic recording disk according to the present invention, wherein a portion thereof is cut away so that the peripheral portion of the substrate can be observed, and wherein a mask is disposed on the substrate.

Next, there will be described a process for producing the photomagnetic recording disk according to the present invention as described above, with reference to FIGS. 2 and 3. A sputtering process may be used as a vacuum film formation (or vacuum vapor deposition) process.

First of all, the substrate 11 in the form of a disk is fixed to a substrate holder 20 disposed in a bell jar (not shown) of a vacuum film formation device. Then, a mask 30 in the form of a ring is disposed on the peripheral edge of the substrate 11 in the form of a disk. The mask 30 is characterized by the configuration or shape of the inner peripheral surface of the mask 30.

More specifically, the inner peripheral surface of the mask 30 has a projection portion 30a having an inclined surface 32 projecting to the inside of the mask with respect to the surface 31 on which the mask is disposed, and having an inclined surface 33 extending toward the outside from the innermost portion of the projection portion 30a. The projection portion 30a is formed along the entirety of the inner periphery of the mask 30. The inclined surface 32 of the projection portion 30a may incline at an angle of 10 to 60 degrees, more preferably 35 to 55 degrees with respect to the surface 31 on which the mask 30 is disposed. When such an inclined surface 32 of the projection portion 30a provided, the material for the film to be formed may appropriately spread along the inclined surface 32, so that it may cover the side edge portion 13a of the recording film 13 as described above.

Figure 3:
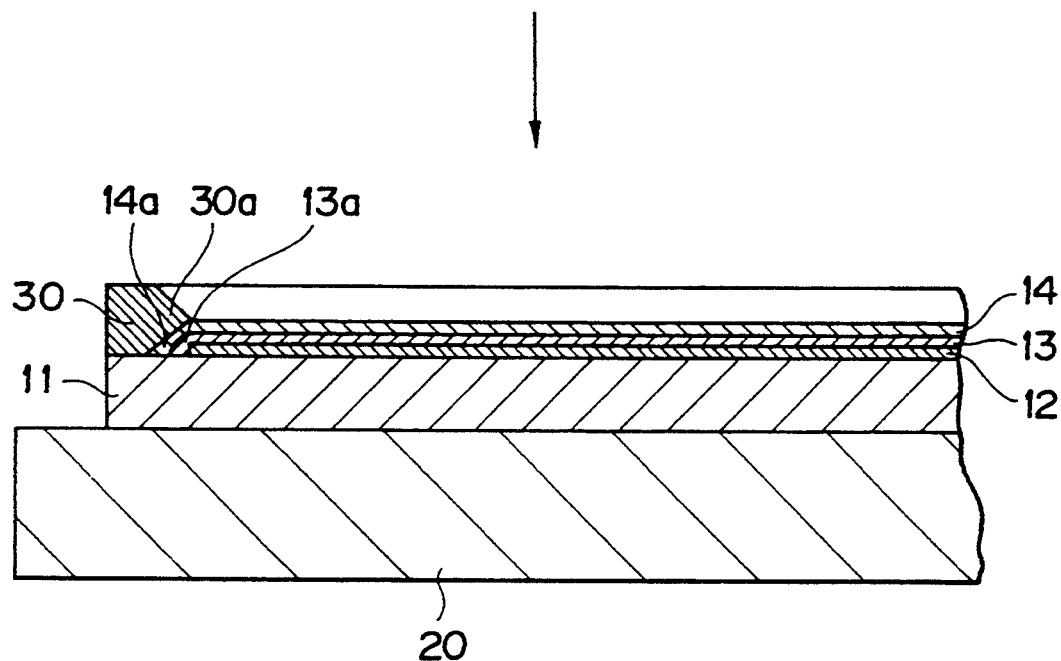
FIG. 3 is a schematic sectional view for illustrating a process for producing the photomagnetic recording disk according to the present invention, wherein a portion thereof is cut away so that the peripheral portion of the substrate can be observed, and wherein a mask is disposed on the substrate and then a thin film is formed by sputtering.
Figure 4:
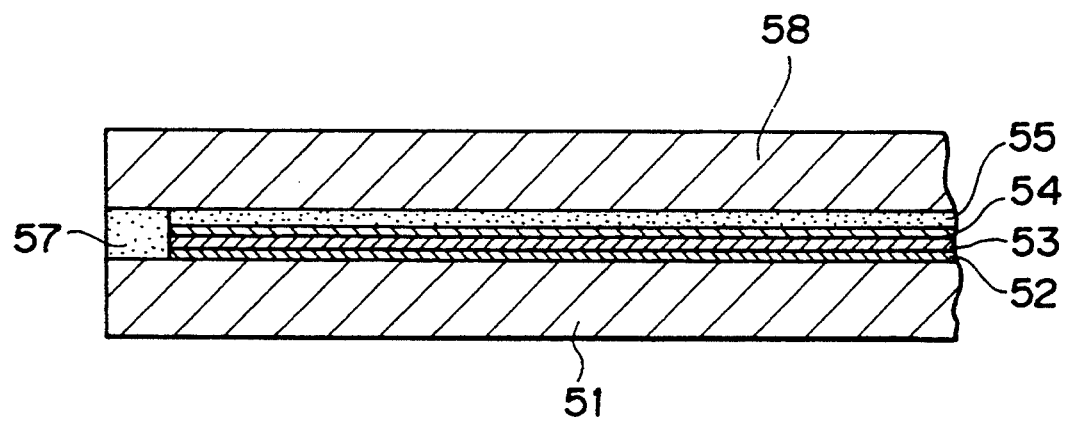
FIG. 4 is a schematic sectional view of a photomagnetic recording disk produced in the prior art, wherein a portion thereof is cut away so that the peripheral portion can be observed.
Figure 5:
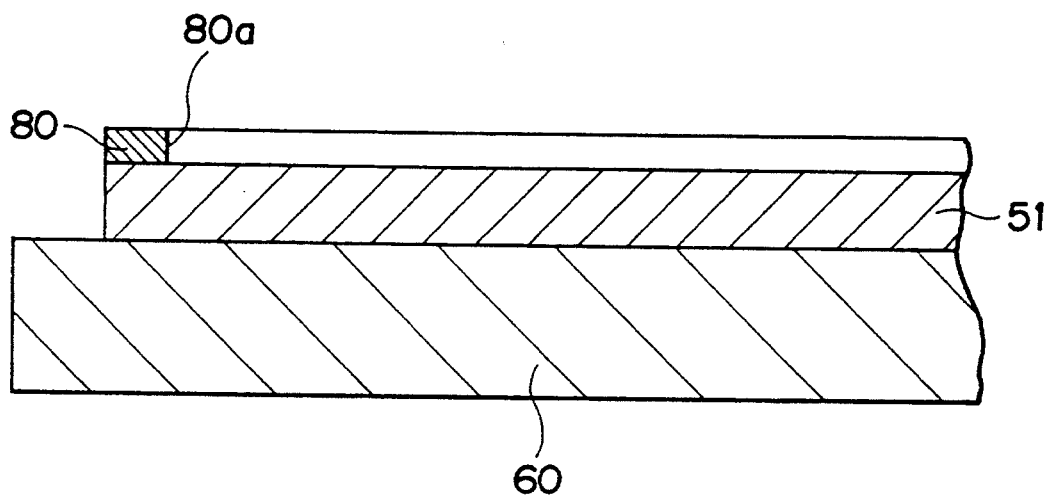
FIG. 5 is a schematic sectional view for illustrating a process for producing the photomagnetic recording disk in the prior art, wherein a portion thereof is cut away so that the peripheral portion of the substrate can be observed, and wherein a mask is disposed on the substrate.
Figure 6:
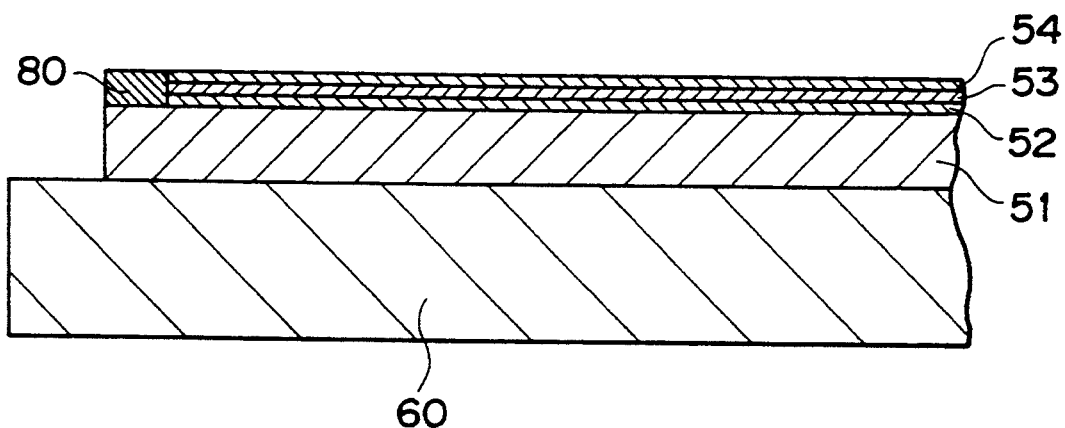
FIG. 6 is a schematic sectional view for illustrating a process for producing the photomagnetic recording disk in the prior art, wherein a portion thereof is cut away so that the peripheral portion Of the substrate can be observed, and wherein a mask is disposed on the substrate and then a thin film is formed by sputtering.

After the mask 30 is disposed on the substrate 11, the dielectric material film 12 is caused to be laminated thereon in a manner of sputtering by using a dielectric material as a target. In such a case, it is preferred that the outer peripheral edge face of the dielectric material film 12 is caused to have a shape or configuration as shown in FIG. 3, which is formed so as not to occur the wraparound phenomena. For this reason, the pressure of an inert gas (i.e., pressure for sputtering) as a sputtering condition may preferably be 0.5 Pa or below, particularly preferably 0.02 to 0.2 Pa. Specific examples of the inert gas may include argon, helium, krypton, etc. ... In general, argon may be used in view of an economical factor.

Then, the recording film 13 is formed on the thus formed dielectric material film 12 by using a sputtering process. In such a case, it is preferred that the outer peripheral edge face of the recording film 13 is formed so as to have a shape or configuration as shown in FIG. 3 by occurring wraparound phenomenon slightly. For this reason, the pressure of an inert gas (e.g., pressure of the argon gas) as a sputtering condition may preferably be higher than that used at the time of the film formation of the above dielectric material film 12. More specifically, the pressure of the inert gas may preferably be approximately 0.2 to 0.6 Pa.

Then, the protection film 14 is formed on the thus formed recording film 13 by using a sputtering process. In such a case, the pressure of an inert gas (e.g., pressure of the argon gas) as a sputtering condition may preferably be higher than that used at the time of the film formation of the above recording film 13. At this time, the film forming material for the protection film 14 spreads along the inclined surface 32 of the projection portion 30a of the mask 30 so that it covers the side edge portion 13a of the above recording film 13. When the side edge portion 13a is covered in such a manner, the resultant corrosion resistance may considerably be improved. More specifically, the pressure of the inert gas may preferably be 0.6 to 2 Pa, more preferably 0.8 to 1.3 Pa.

When the above three species of the films are formed, the following conditions may for example be used as the sputtering conditions:

Electric Power: 0.2 to 1.5 KW,
Target Voltage: 0.2 to 1.0 KV,
Target Interval: 50 to 200 mm,
Target Diameter: 100 to 300 mm, and
Substrate Temperature: 20° to 100° C.

After such a sputtering film formation process is completed, the resultant product comprising the substrate and the predetermined films formed thereon is taken out from the bell jar. Thereafter, the mask 30 is removed from the resultant product, the protection plate 18 is bonded thereto through the adhesive layer 15, and the outer peripheral side face of the resultant optical recording disk is filled with the filler material 17.

Hereinbelow, the present invention is described in further detail with reference to a specific Experimental Example.

EXPERIMENTAL EXAMPLE

A glass substrate having a diameter of 30 cm and a thickness of 1.2 mm was fixed to a substrate holder disposed in a bell jar of a vacuum film formation device. Then, on the peripheral edge portion of the substrate in the form of a disk, a mask having a projection portion having an outer diameter of 40 cm, an inner diameter of 29 cm and a thickness of 5 mm was disposed. An inclined surface of the projection portion was inclined at an angle of 45 degrees with respect to the face on which the mask was disposed.

Then, a dielectric material layer 80 nm thick was formed on the substrate in a sputtering manner by using a dielectric material comprising ZnS as a target. In such a case, the inert gas pressure (sputtering pressure) was 0.04 Pa. Argon was used as the inert gas. On the thus formed dielectric material film, a recording film 90 nm thick comprising TbFeCo was formed by a sputtering process. The inert gas pressure used herein was 0.6 Pa.

Then, on the thus formed recording film, a protection film 100 nm thick comprising ZnS was formed by a sputtering process. The inert gas pressure used herein was 1.3 Pa.

When the outer peripheral side face of the thus prepared optical recording disk according to the present invention was observed by using a scanning electron microscope (SEM), it was confirmed that the side face of the recording film was completely covered with the protection film. Further, the corrosion resistance of the above optical disk was evaluated by comparing the corrosion resistance thereof with that of an optical recording disk prepared according to a conventional production process, by use of a test under high temperature and high humidity conditions. As a result, it was confirmed that the corrosion resistance of the optical recording disk according to the present invention had remarkably been improved, as compared with that of the conventional optical recording disk.

In the above specific Example, a photomagnetic recording disk of a single side recording type is described as an example. However, the present invention is also applicable to a photomagnetic recording disk of a so called dual side recording type wherein a pair of plate members comprising a substrate and a recording film disposed thereon are bonded to each other so that the recording surfaces thereof are disposed opposite to each other. In addition, as a matter of course, the present invention is also applicable to an optical recording disk of another recording type such as pit formation recording type, phase change recording type and color change recording type.

The present invention provides an optical recording disk comprising a light transmissive substrate, a recording film disposed on the substrate directly or through an intermediate layer and a protection film disposed on the recording film, the protection film comprises a dielectric material and the entirety of the upper flat surface and the side surface of the recording film is integrally covered with the protection film. As a result, in the optical recording disk according to the present invention, a substance capable of causing the corrosion thereof is prevented from entering the side face of the recording film, whereby the corrosion resistance of the optical recording disk is remarkably improved.

The present invention also provides a process for producing an optical recording disk, which comprises: disposing, on a peripheral edge portion of a disk substrate, a mask in the form of a ring which has a projection portion over the entirety of the inner peripheral portion of the ring; forming a recording film on the substrate by use of a sputtering process; and forming a dielectric material protection film by use of a sputtering process under a pressure of an inert gas which is higher than that used at the time of the formation of the recording film. For this reason, in the recording disk according to the present invention, the upper flat surface and the entirety of the side surface of the recording film is integrally covered with the dielectric material protection film, whereby the corrosion resistance of the optical recording disk is remarkably improved.

What is claimed is:

1. An optical recording disk comprising:
a light transmissive substrate, a recording film disposed on the substrate directly or through an intermediate layer, and a protection film disposed on the recording film, wherein an entire upper flat surface and a side surface of the recording film are integrally covered with the dielectric material protection film and said dielectric material protection film comprises a material selected from the group consisting of ZnS, $SiN_x$, AlN, AlON, SiO, $SiO_2$, and $CaF_2$.

2. An optical recording disk according to claim 1, wherein the recording film comprises a metal material.

3. An optical recording disk according to claim 1, wherein the recording film is laminated on the substrate so that it does not cover a peripheral edge portion of a flat surface of the substrate.

4. An optical recording disk according to claim 1, wherein the intermediate layer comprises a thin film consisting of a dielectric material.

5. An optical recording disk according to claim 1, wherein the recording film and the protection film have been formed by use of a sputtering process.

* * * * *